United States Patent
Sinha et al.

(10) Patent No.: US 11,568,835 B2
(45) Date of Patent: Jan. 31, 2023

(54) DISPLAY CONTROL APPARATUS, COMPUTING DEVICE, PROCESSING UNIT AND CORRESPONDING METHODS AND COMPUTER PROGRAMS

(71) Applicant: Intel Corporation, Santa Clara, CA (US)

(72) Inventors: Vishal Sinha, Portland, OR (US); Paul Diefenbaugh, Portland, OR (US); Douglas Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/451,652

(22) Filed: Oct. 21, 2021

(65) Prior Publication Data

US 2022/0044654 A1  Feb. 10, 2022

Related U.S. Application Data

(63) Continuation of application No. 16/906,029, filed on Jun. 19, 2020, now Pat. No. 11,244,654.

(51) Int. Cl.
*G09G 5/10* (2006.01)
(52) U.S. Cl.
CPC ......... *G09G 5/10* (2013.01); *G09G 2320/064* (2013.01); *G09G 2354/00* (2013.01)
(58) Field of Classification Search
CPC ............... G09G 5/10; G09G 2320/064; G09G 2354/00; G09G 3/3406; G09G 2320/0633; G09G 2330/021; G09G 2330/022; G09G 2340/0435; G09G 2360/18; G09G 5/006; G09G 3/2096; G09G 3/20; G06F 1/3215; G06F 1/3265; G06F 3/0304; Y02D 10/00
See application file for complete search history.

(56) References Cited

U.S. PATENT DOCUMENTS

| | | | |
|---|---|---|---|
| 9,678,559 B1* | 6/2017 | Devries | G06F 3/16 |
| 2011/0084709 A1* | 4/2011 | Asjes | G01N 27/221 |
| | | | 324/658 |
| 2011/0135114 A1* | 6/2011 | Oba | H04N 21/4415 |
| | | | 381/107 |
| 2016/0314763 A1* | 10/2016 | Matthews | G09G 5/02 |
| 2018/0182357 A1* | 6/2018 | Yun | G09G 3/3406 |
| 2021/0132769 A1* | 5/2021 | Parikh | G06F 21/83 |
| 2021/0149441 A1* | 5/2021 | Bartscherer | G06F 21/83 |

* cited by examiner

*Primary Examiner* — Rodney Amadiz
(74) *Attorney, Agent, or Firm* — 2SPL Patent Attorneys PartG mBB; Yong Beom Hwang

(57) ABSTRACT

Examples relate to a display control apparatus for a display, to a computing device with an integrated display and a display control apparatus, a processing unit for a computing device with an integrated display and to corresponding methods and computer programs. The display control apparatus comprises interface circuitry and processing circuitry. The processing circuitry is configured to obtain, via the interface circuitry, information on a user of the display, the information on the user indicating a presence of the user relative to the display or an engagement of the user with the display. The processing circuitry is configured to control, based on the information on the user, a display mode of the display, the display mode affecting at least one of a refresh rate and a backlight of the display.

17 Claims, 6 Drawing Sheets

DISPLAY CONTROL APPARATUS, COMPUTING DEVICE, PROCESSING UNIT AND CORRESPONDING METHODS AND COMPUTER PROGRAMS

FIELD

Examples relate to a display control apparatus for a display, to a computing device with an integrated display and a display control apparatus, a processing unit for a computing device with an integrated display and to corresponding methods and computer programs.

BACKGROUND

In modern computing devices, such as laptop computers, the display contributes a major portion of the energy usage of the computing device.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
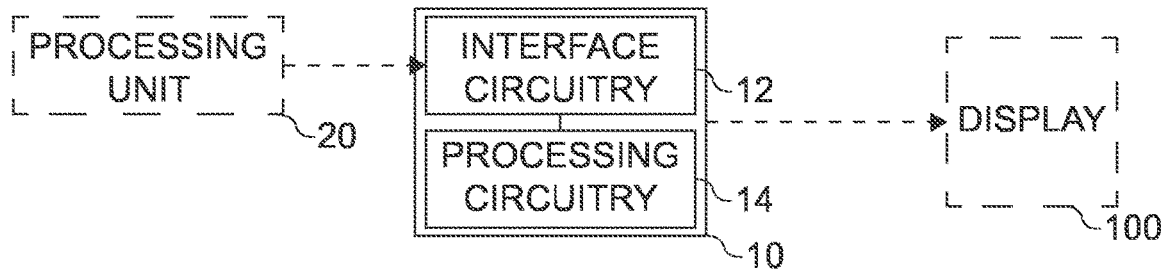
FIGS. 1a and 1b show block diagrams of examples of a display controller, display control apparatus or display control device for a display.

Some examples are now described in more detail with reference to the enclosed figures. However, other possible examples are not limited to the features of these examples described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to user-presence based zero refresh and low refresh idle states for display panels.

Various examples of the present disclosure provide a concept for avoiding an existing Windows power management limitation which negatively impacts the battery life savings of an adaptive dimming feature of a User Presence Detection Device, UPDD, and new low power and instant resume display idle states for a scenario where user is not actively using the system.

In the popular Windows operating system, the display and the display electronics are usually switched off after a default operating system (OS) inactivity timeouts which is ~4 to 5 mins for Windows. Examples are based on a technology that can provide significant battery life gains of ~20% (depending on the system) by aggressively lowering the display backlight and turning off the display panel electronic. The technology, in the following denoted as UPDD, can instantly detect scenarios where a user is present but not looking at the system (disengaged) or not present at the system. This detection can then be used as a trigger to lower the backlight power or turn off the display, and seamlessly do the reverse when the user returns.

Today, in Windows OS, in the connected standby mode (S0ix), the system turns off the display panel electronics, which results in locking the above system. This limitation has direct impact on how aggressive the Adaptive Dimming can turn off the display because doing it immediately (for non-Windows Hello systems) might cause user annoyance if the users have to frequently enter the password on short breaks in a secure environment. One approach for dealing with this can be to increase the display off timeouts for the Adaptive Dimming feature but doing so, the opportunity to lower the display power consumption may be decreased, hence reducing the battery life saving of the feature. Another approach could be to adapt the OS to change the respective policies.

The (Windows) OS inactivity timeout (for display management) has been widely used to reduce the display power, but this timeout may be considered inefficient because it often operates in magnitude of minutes (~5 mins for the latest Windows OS). Additionally, the OS inactivity timeout may be based on the last human interface device (HID) event, which might not be the most accurate because user can be present at the system without HID interaction. Therefore, the OS inactivity method may provide an inefficient method because of long timeouts, and may be inaccurate because it uses the last HID event to detect user presence.

In addition, some displays provide display power management features like Panel Self Refresh (PSR), Low Refresh Rate (LRR), Display Power Saving Technology (DPST), etc. The listed display power management features offer significant power saving, where the PSR and LRR leverage the idleness in the workload to provide power saving on SoC and display respectively, whereas the DPST alters the contrast of the darker contents without impacting user perception to lower the display backlight power. These features might not be designed to make use of the user presence state, and thus might not have optimizations related to the user presence state.

Furthermore, Timing Controllers (TCON) of at least some systems may be unaware of the user inactivity. Therefore, there may be an inability to indicate user inactivity to timing controller (TCON) to lower the display power. Many display panel TCONs might not be aware of the user presence state, hence they do not support any special power saving mode to reduce the display power when user is not looking at the screen or not present. If provided with the user presence state, as proposed in various examples of the proposed concept, the TCONs can lower the display power with ultra-low resume latency such that there is no impact on user experience.

Figure 1B:
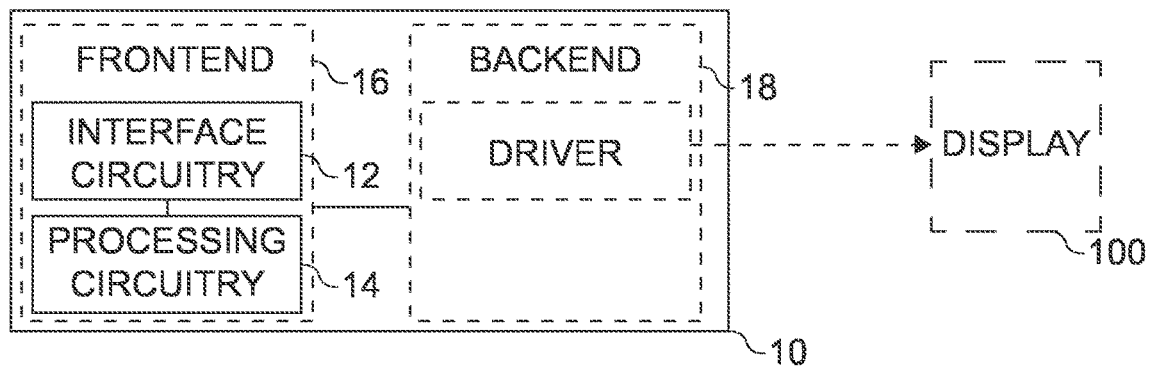

FIGS. 1a and 1b show block diagrams of examples of a display controller 10, e.g. a display control apparatus 10 or display control device 10, for a display 100. The components of the display control device 10 are defined as component means, which correspond to the respective structural components of the display control apparatus 10. In the following, the components of the display control apparatus are introduced in parentheses after the respective structural components of the display control apparatus. The display control apparatus/device comprises interface circuitry 12 (means for communicating 12) and processing circuitry 14 (means for processing 14), which is coupled to the interface circuitry 12. The processing circuitry (and likewise the means for processing) is configured to obtain, via the interface circuitry (or likewise the means for communication), information on a user of the display. The information on the user indicates a presence of the user relative to the display or an engagement of the user with the display. The processing circuitry is configured to control, based on the information on the user, a display mode of the display. The display mode affects at least one of a refresh rate and a backlight of the display. FIG. 1a further shows a computing device with an integrated display 100 (e.g. a tablet computer 200, laptop computer 200 or all-in-one-computer 200 with an integrated display). The computing device further comprises the display control apparatus or device 10 and a processing unit 20.

Figure 1C:
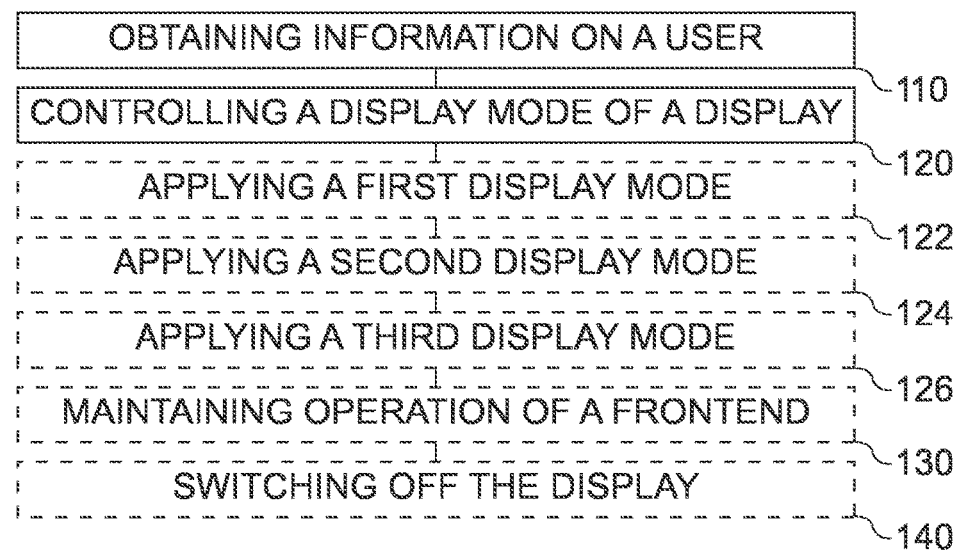
FIG. 1c shows a flow chart of an example of a display control method for a display.

FIG. 1c shows a flow chart of an example of a corresponding display control method for the display. The display control method comprises obtaining 110 the information on the user of the display. The method comprises controlling 120, based on the information on the user, the display mode of the display.

The following description relates to the display controller, display control apparatus or display control device 10 of FIGS. 1a and/or 1b and to the corresponding display control method of FIG. 1c.

Various examples of the present disclosure relate to a display controller, display control apparatus, display control device, display control method and corresponding computer program for a display 100. In general, computing devices are modular—they usually include a portion of a computing device that is responsible for performing computations, processing incoming signals, and generating outgoing signals. This portion usually includes the processing unit, e.g. the processor or System-on-Chip (SoC), of the computing device, a graphics processing unit, memory and one or more controllers. In addition, computing devices usually comprise one or more additional components. For example, in some computation devices, such as laptop computers, tablet computers or all-in-one computers, the computation devices further include an integrated display, i.e. a display that is integrated within a main unit of the computation device. Alternatively, the display may be separate from the computing device.

In both cases, the display is usually coupled with a display controller, such as the display control apparatus or display control device 10. This display controller may be used to provide a high-level access to the display for the processing unit, while taking care of the actual operation of the display for the processing unit. For example, such a display controller may comprise an interface for receiving a display signal from the processing unit (or from a graphics processing unit), a frame buffer for buffering the frames received via the display signal, a timing controller for controlling the timing of the display, and display drivers for generating the appropriate signals for driving the actual display panel. For example, the display control apparatus may comprise, as shown in FIG. 1b, a frontend section 16 and a backend section 18. The frontend section may be responsible for receiving display data from the processing unit, and for buffering the received display data (in a (remote) frame buffer, RFB). Accordingly, the frontend section may comprise the interface 12 (for receiving information, such as the display information, from the processing unit) and the processing circuitry (for processing the received information). The backend section may be responsible for driving the display. Accordingly, the backend section may comprise the actual display driver, i.e. driver circuitry for driving the display. The display controller, e.g. the frontend section, may be configured to receive, e.g. via the interface circuitry, a stream of display data from the processing unit of the computing device comprising the display or being coupled with the display, and to operate a frame buffer. Accordingly, the frontend section may comprise the interface circuitry for receiving the stream of display data, and the frame buffer.

In various examples of the present disclosure, the above concept is extended to allow for a more nuanced operation of the display. In particular, the present disclosure provides a concept for driving the display in different display modes, depending on a presence or engagement of a user of the display. The processing circuitry is configured to obtain, via the interface circuitry, the information on the user of the display. For example, the information on the user of the display may be received as a communication packet via the interface circuitry, or as a status bit or bit vector as part of the stream of display data. For example, the processing circuitry may be configured to obtain the information on the user from the processing unit of a computing device comprising the display, or from the processing unit of a computing device being coupled to the display (the display being an external display in this case).

The information on the user indicates a presence of the user relative to the display or an engagement of the user with the display. For example, the information on the user may comprise information that indicates whether the user is present in front of the display or whether the user has been present in front of the display within a pre-defined time interval (e.g. within the last thirty seconds or within the last minute). Additionally (or alternatively), the information on the user may comprise information that indicates whether the user is engaged with the display, i.e. whether the user is looking at the display, or whether the user has looked at the display within a pre-defined time interval (e.g. within the last 15 seconds or within the last 30 seconds). In other words, the user may be engaged with the display if the user is looking at the display, or has been looking at the display within a pre-defined time interval (e.g. within the last 15 seconds or within the last 30 seconds). For example, the information on the user may have (exactly) two states—that the user is present (first state) and that the user is absent (second state). Alternatively, the information may have (exactly) three states—that the user is present and engaged (first state), that the user is absent (second state), and that the user is present but disengaged (third state). For example, the user may be present and disengaged if the user is present in front of the display, but looking away from the display (e.g. at a desk, at a phone, at another person or in another direction). In general, the information on the user may be determined by the computation device. For example, the computation device may comprise a sensor for sensing the presence or engagement of the user, e.g. a camera and corresponding sensor circuitry, e.g. a user presence detection device. For example, the computation device, or a display device comprising the display and the display controller, may comprise the user presence detection device. The sensor circuitry, or alternatively the processing unit, may be configured to process image data of the camera (e.g. at a low resolution), and use an algorithm, or a machine-learning model, to determine whether the user is present or absent, and optionally whether the user is engaged or disengaged. Accordingly, the information on the user may be based on a camera-based determination of the presence or engagement of the user, i.e. a determination of the presence or engagement of the user that is based on image data of a camera.

The processing circuitry is configured to control, based on the information on the user, the display mode of the display. For example, the processing circuitry may be configured to select, and apply, a display mode of a plurality of display mode, based on the information on the user, e.g. based on whether the user is present or absent, engaged or disengaged. The display mode affects at least one of a refresh rate and a backlight of the display. Additionally, the display mode may further affect the information that is being displayed on the screen. For example, in some display modes, the pixels may be set to black.

For example, the plurality of display modes may comprise a first display mode and a second display mode, and optionally a third display mode. For example, the first display mode may be used when the information on the user exhibits the first state, the second display mode may be used when the information on the user exhibits the second state, and, optionally, the third display mode may be used when the information on the user exhibits the third state.

Accordingly, the processing circuitry may be configured to apply 122 the first display mode if the information on the user indicates that the user is present or if the information on the user indicates that the user is present and engaged (first state). The processing circuitry may be configured and to apply 124 the second display mode if the information on the user indicates that the user is absent (second state). The processing circuitry may be configured to apply 126 the third display mode if the information on the user indicates that the user is present and disengaged.

The individual display modes may influence the refresh rate and/or the backlighting of the display. For example, the processing circuitry may be configured to apply a first refresh rate in the first display mode and a second refresh rate in the second display mode. The processing circuitry may be configured to apply a third refresh rate in the third display mode (if the third display mode is supported). The first refresh rate may be higher than the second refresh rate.

The third refresh rate may be between the first refresh rate and the second refresh rate. For example, the first refresh rate may be the "normal" refresh rate of the display, e.g. the refresh rate that is used in normal operation of the display, which may be the maximal refresh rate of the display, or, if the display is a display being suitable for gaming, a refresh rate that is being used for displaying the operating system of the computation device. For example, the first refresh rate may be at least 50 Hz. For most displays, the first refresh rate may be 60 Hz. The second refresh rate may be much lower, e.g. to conserve energy. For example, the second refresh rate may be at most 10 Hz, e.g. 1 Hz or 0 Hz (no refresh). The third refresh rate may be between the first and second, e.g. at least 1 Hz and less than a nominal refresh rate of the display (e.g. between 1 Hz and 59 Hz in case the display is a 60 Hz display), e.g. between 10 Hz and 40 Hz. For example, some displays may support non-zero refresh rates that go as low as 20 Hz.

In terms of the backlighting, a similar approach may be used—in the first display mode, the backlight may be operated at a "normal" level (i.e. a level that is chosen by the user or based on a brightness of an environment of the display), in the second display mode, the backlight may be switched off, and, optionally, in the third mode, the backlight may be dimmed. In other words, the processing circuitry may be configured to apply a first backlighting configuration in the first display mode. The processing circuitry may be configured to apply a second backlighting configuration in the second display mode. The processing circuitry may be configured to apply a third backlighting configuration in the third display mode. For example, the backlighting configuration may affect the brightness of the backlight, and/or whether the backlight is activated or deactivated. For example, the first backlighting configuration may yield a brighter backlight than the second backlighting configuration. The third backlighting configuration may yield a brighter backlight than the second backlighting configuration. The first backlighting configuration may yield a brighter backlight than the third backlighting configuration. In effect, the backlight may be brightest in the first display mode, darkest in the second display mode, and dimmed in the third display mode (i.e. between the brightness of the first and second display mode). For example, the processing circuitry may be configured to switch off the backlight in the second display mode, or to set the backlight to the lowest brightness level. In addition, the processing circuitry may be configured to set pixels to be displayed on the display to black in the second display mode and/or switch off other components of the backend, such as the drivers, the display backplane or the power management integrated circuit or voltage regulator. For example, the brightness of the backlight may be controlled using various means, e.g. by using different currents to achieve different levels of brightness, or by using different pulse-width modulation settings.

In some cases, it may be desirable to allow for a rapid return to operation once the user reengages with the display or once the user is again present in front of the display. To speed up the return to the first display mode (from the second or third display mode), some functionality of the display controller may be maintained. As has been mentioned above, the display control apparatus may be configured to receive a stream of display data from a processing unit of a computing device comprising the display, and to operate a frame buffer. The processing circuitry may be configured to maintain 130 receiving the stream of display data and operating the frame buffer in the first display mode, in the second display mode and/or in a third display mode.

In other words, the display control apparatus may be configured to receive the stream of display data (at full speed) in the first, second and, optionally, third display mode. At the same time, the display control apparatus may continue operating the frame buffer in the first, second and, optionally, third display mode. Referring back to the separation of the functionality of the display controller into a backend second and a frontend section, the frontend section may continue to operate the same in the first, second and third display mode. The backend section, i.e. the driver that controls the refresh rate and/or the backlight, may be operated at a reduced power, i.e. reduced speed or brightness. In other words, the operation of the frontend section is maintained 130 in the first display mode, in the second display mode and/or in the third display mode. The operation of the backend section may be reduced in the second display mode and in the third display mode. The display control apparatus may be configured to (instantly) return to the first display mode (or the third display mode) once the information on the user indicates the presence (and engagement or disengagement) of the user. For example, the display control apparatus may be configured to return to the first display mode, e.g. to resume operation of the backend section, within at most 500 ms (or at most 200 ms, at most 100 ms) after the information on the user indicates the presence (and engagement or disengagement) of the user.

If the user remains absent too long, e.g. at least a pre-defined time-interval, such as five minutes or ten minutes, the display may be switched off completely (while the UPDD may remain active or be switched off as well). In other words, the processing circuitry is configured to switch 140 off the display if the user remains absent for a pre-defined time interval. For example, the processing circuitry may be configured to apply a fourth display mode, with the display being switched off in the fourth display mode. The processing circuitry may be configured to return to one of the other display modes, e.g. to the third display mode, once the information on the user exhibits the third state again after the display is switched off/in the fourth display mode.

The interface circuitry or means for communicating 12 may correspond to one or more inputs and/or outputs for receiving and/or transmitting information, which may be in digital (bit) values according to a specified code, within a module, between modules or between modules of different entities. For example, the interface circuitry or means for communicating 12 may comprise interface circuitry configured to receive and/or transmit information.

In various examples, the processing circuitry or means for processing 14 may be implemented using one or more processing units, one or more processing devices, any means for processing, such as a processor, a computer or a programmable hardware component being operable with accordingly adapted software. In other words, the described function of the processing circuitry or means for processing 14 may as well be implemented in software, which is then executed on one or more programmable hardware components. Such hardware components may comprise a general-purpose processor, a Digital Signal Processor (DSP), a micro-controller, etc.

More details and aspects of the display controller, display control apparatus, display control device, display control method or computing device are mentioned in connection with the proposed concept or one or more examples described above or below (e.g. FIG. 2a to 6). The display controller, display control apparatus, display control device, display control method or computing device may comprise one or more additional optional features corresponding to one or more aspects of the proposed concept or one or more examples described above or below.

Figure 2A:
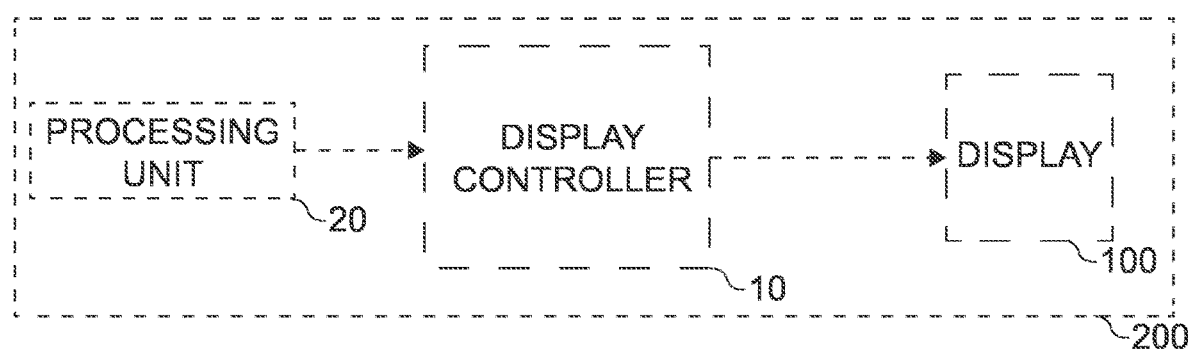
FIG. 2a shows a block diagram of an example of a processing unit for a computing device, and of a computing device comprising a processing unit, an integrated display, and a display controller.

FIG. 2a shows a block diagram of an example of a processing unit 20 for a computing device 200. FIG. 2a further shows a block diagram of an example of the computing device 200 comprising a processing unit 20, an integrated display 100 and a display controller 10, e.g. the display control apparatus or display control device 10 of FIGS. 1a and/or 1b. The processing unit is configured to determine information on a user of the display. The information on the user indicates a presence of the user relative to the display or an engagement of the user with the display. The processing unit is configured to provide the information on the user to a display control apparatus or device 10 of the computing device.

Figure 2B:
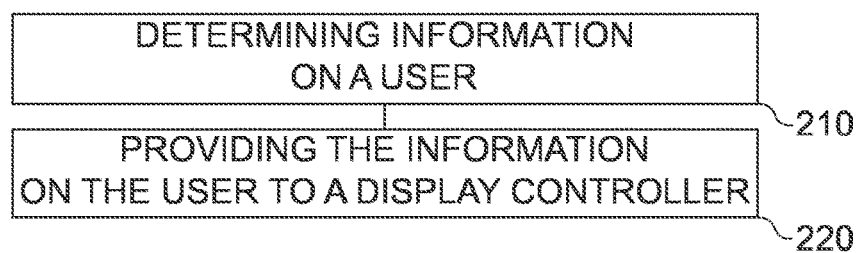
FIG. 2b shows a flow chart of an example of a method for a computing device.

FIG. 2b shows a flow chart of an example of a corresponding method for the computing device. The method comprises determining 210 the information on a user of the display. The method comprises providing 220 the information on the user to a display controller of the computing device.

The following description relates to the processing unit of FIG. 2a and to the corresponding method for the computation device of FIG. 2b.

Various examples of the present disclosure relate to a processing unit or method for a computation device, and to a computation device that comprises the processing unit or that is configured to perform the method for the computation device. While FIGS. 1a to 1c relate to the display controller, FIGS. 2a to 2b relate to the corresponding processing being performed by the processing unit, e.g. the processor or SoC, of the computation device. For example, the functionality introduced in connection with FIGS. 2a and/or 2b may be provided by a driver software for the display controller that is executed by the processing unit, or by an operating system being executed by the processing unit. The processing unit is configured to determine the information on the user of the display. As has been laid out in connection with FIGS. 1a to 1c, the information on the user may exhibit one of two or one of three states. For example, the information on the user may indicate that the user is present (first state) and that the user is absent (second state). Alternatively, the information may have (exactly) three states—that the user is present and engaged (first state), that the user is absent (second state), and that the user is present but disengaged (third state). Accordingly, the processing unit may be configured to determine whether the user is present, and/or wherein the user is engaged with the display.

There are various approaches for determining whether the user is present, or whether the user is engaged with the display. As has been mentioned in connection with FIGS. 1a to 1c, a camera may be used to determine the presence and engagement of the user. Alternatively, the presence of a wearable device may be used to determine the presence of the user (which may be detected via Bluetooth, for example). Input being performed by the user may be used to determine the engagement of the user with the display. In the following, the focus is based on the camera-based determination of the presence or engagement of the user. In other words, the information on the user may be based on a camera-based determination of the presence or engagement of the user. For example, a camera, such as a webcam, may be used for this purpose. Again, two different approaches may be chosen. For example, the presence and/or engagement of the user may be determined by the processing unit. For example, the processing unit may be configured to process image data of a camera to determine the presence and/or engagement of the user. For example, an image processing algorithm may be used to determine the presence and/or engagement of the user, or a machine-learning model may be used to determine the presence of the user based on the image data. Alternatively, a separate user presence detection device may be used to determine the presence in front of and/or engagement of the user with the display, e.g. based on image data of a camera. In this case, the user presence detection device may be configured to perform image processing on the image data, using the image processing algorithm or using a machine-learning model. For example, the machine-learning model may be trained to distinguish between the user being present and the user being absent. Additionally, the machine-learning model may be trained to distinguish between the user being present and engaged, and the user being present and disengaged. Either way, the processing unit may be configured to encode the information on the user (to exhibit one of the first, second (or third) state) based on the presence and/or engagement of the user.

The processing unit is further configured to provide the information on the user to the display control apparatus of the computing device, e.g. as a packet, or as status bits with the stream of display data. For example, the processing unit may be configured to include the information on the user with the display data that is provided to the display control apparatus (by the processing unit or by a separate graphics processing unit).

In various examples, the processing unit 20 may be implemented using one or more processing units, one or more processing devices, any means for processing, such as a processor, a computer or a programmable hardware component being operable with accordingly adapted software. In other words, the described function of the processing unit 20 may as well be implemented in software, which is then executed on one or more programmable hardware components. Such hardware components may comprise a general-purpose processor, a Digital Signal Processor (DSP), a micro-controller, etc.

More details and aspects of the computation device or processing unit are mentioned in connection with the proposed concept or one or more examples described above or below (e.g. FIG. 1a to 1c, 3 to 6). The computation device or processing unit may comprise one or more additional optional features corresponding to one or more aspects of the proposed concept or one or more examples described above or below.

Figure 3:
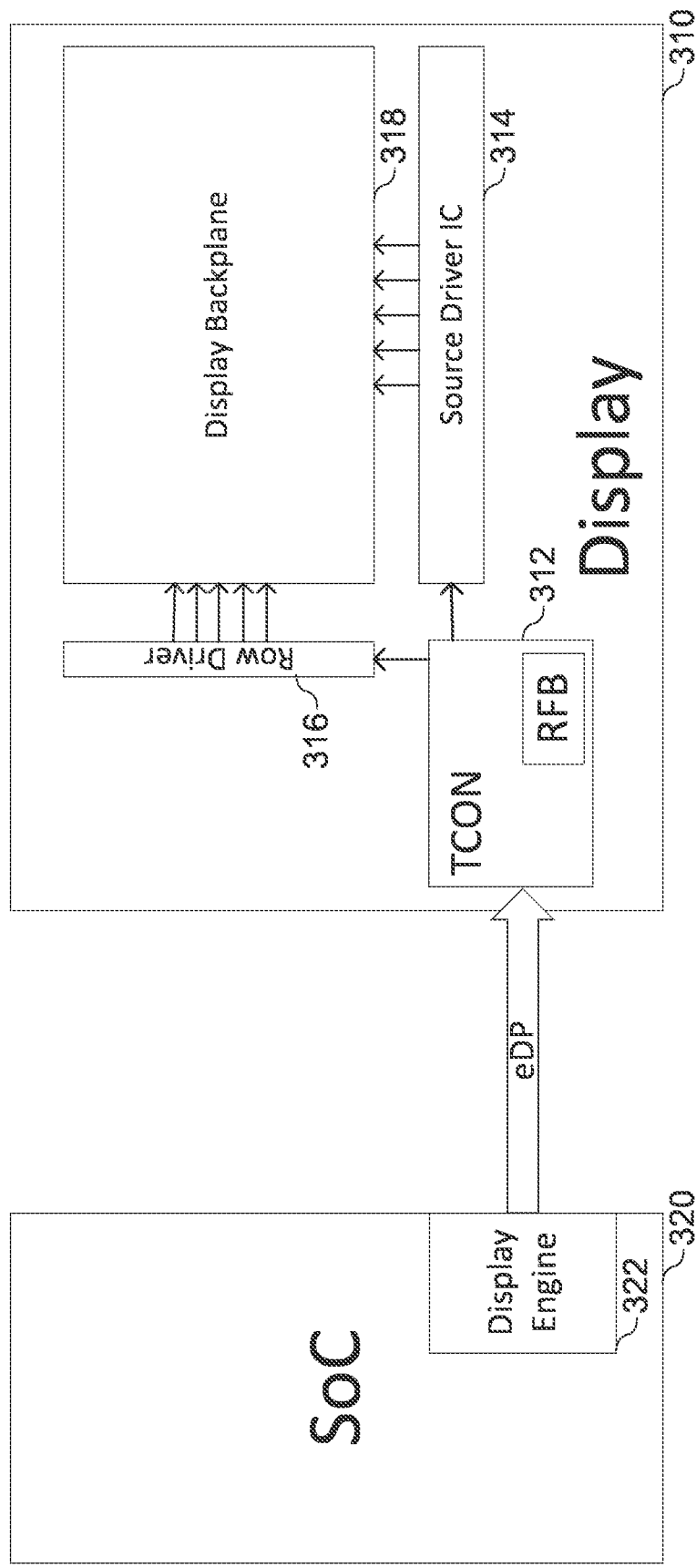
FIG. 3 shows a high-level diagram of an example of a display architecture.

In the following, an exemplary display architecture is shown. FIG. 3 shows a high-level diagram of an exemplary display architecture. The system on chip (SoC) 320, which may correspond to the processing unit 20 of FIG. 2a, comprises a Display Engine (DE) interface 322 for providing a display signal with a stream of display data to the display 310 (which may comprise the display controller 10 and the display 100 of FIGS. 1a to 1c). The display signal is provided to the TCON 212 frontend (the TCON 312 further comprising the remote frame-buffer), and then the TCON backend drives the driver IC's (Source Driver IC 314, Row Driver 316) which in-turn drives the display backplane 318 as shown in FIG. 3. For example, the TCON may correspond to the display controller 10, with the drivers 314 and 316 being associated with the backend of the display controller. The display backend listed in this disclosure implies to drive logic and the display backplane. The Remote Frame buffer (RFB) within the TCON 312 stores the frame to be displayed during self-refresh state.

In various examples of the present disclosure, two new idle states for the display TCON called Zero Refresh Idle (e.g. the second display mode) and Low Refresh Idle (e.g. the third display mode) are introduced to improve the display power when the user is not actively using the system. These idle states may offer instant resume to normal display operation when the user reengages with the system. The user presence activity from the UPDD may be used as trigger for the proposed new idle states of the TCON. The Zero Refresh Idle State, which may be used for a "user not present" scenario and the Low Refresh Idle State may be used for a "user disengaged" (user present but not focusing on the system) scenario. For both the Idle state on user presence action, the display may be instantly resumed to normal operation.

In these new idle states after user inactivity, in Low Refresh Idle (i.e. the third display mode), the TCON backend (the driver logic and display backplane) refresh rate may be lowered to reduce the display power and the TCON frontend (eDP link, RFB) may continue operating in normal display mode (Panel Self Refresh 2, etc.) such that the RFB (Remote Frame Buffer) stays synchronous to the SoC with the latest frame data to instantly resume the display.

In the Zero Refresh Idle State (i.e. the second display mode), the TCON may maintain the frontend in normal operation, drive the pixels all black, and turn off the backend and backlight. Similarly, in the Low Refresh Idle State, the TCON may maintain the frontend in normal operation, dim the backlight, and lower the refresh rate to lowest refresh rate supported by the display.

The Zero Refresh Idle State may be activated while user is not present in front of the system, whereas the Low Refresh Idle may be initiated while user is present but not looking at the system (i.e. the user is disengaged), for example, in a conversation with a colleague. For both the new Idle states, there may be instant resume capability offered to the normal display operation.

Figure 4:
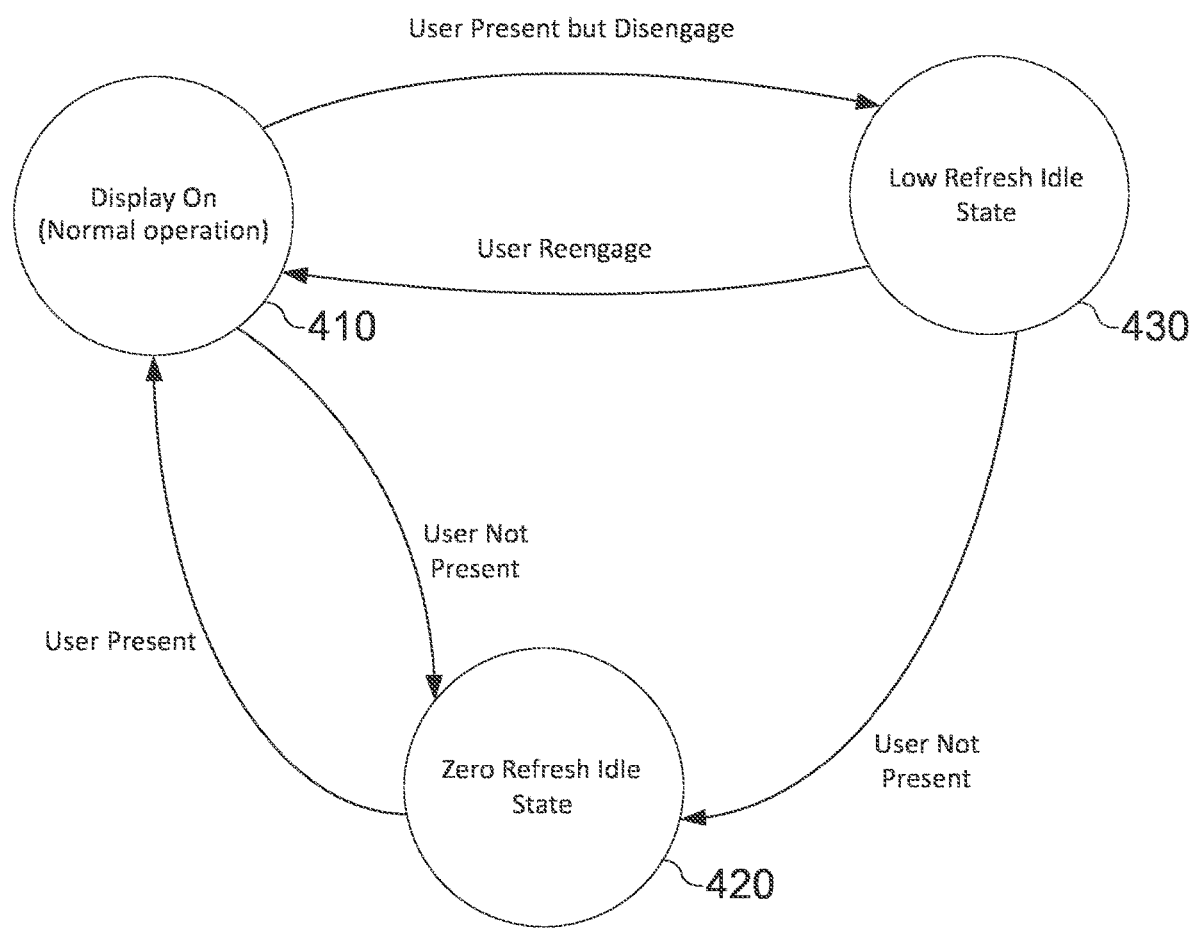
FIG. 4 shows a diagram of an example of a state machine that shows a flow between different idle states.

The Zero Refresh Idle State may be able to provide ~90-95% of display power saving (compared to complete display off), and a low wake-up latency. The Low Refresh Idle State may help reduce the display power by reducing the refresh rate and/or dimming the backlight when the user is disengaged for scenarios with active content on the display. FIG. 4. illustrates the state machine that shows the transitions between the new idle states. In FIG. 4, three display states are shown—Display On (normal operation) 410, e.g. the first display mode, Zero Refresh Idle 420, e.g. the second display mode, and Low Refresh Idle 430, e.g. the third display mode. The Display On 410 state may transition, if the user is not present, to the Zero Refresh Idle state 420, or if the user is present, but disengaged, to the Low Refresh Idle state 430. The Zero Refresh Idle state 420 may transition, if the user is present, to the Display On state 410. The Low Refresh Idle state 430 may transition, if the user reengages, to the Display On state 410, or, if the user is not present, to the Zero Refresh Idle state. As can be seen from the diagram, the transitions may occur in response to a change in the presence or engagement of the user.

The TCON backend (driver logic and display backplane) may be designed to operate at lower refresh rate during these idle states to reduce the display power consumption. Meanwhile, the TCON frontend (embedded DisplayPort (eDP) link, RFB) may continue to operate in normal "display on" conditions such that these new idle states are transparent to the OS. Also, since the frontend operates in normal state, the RFB may always stay up-to-date with the host SoC (i.e. the processing unit of the computing device), hence offer a low wake-up latency (<10 ms) when the user reengages with system.

Figure 5:
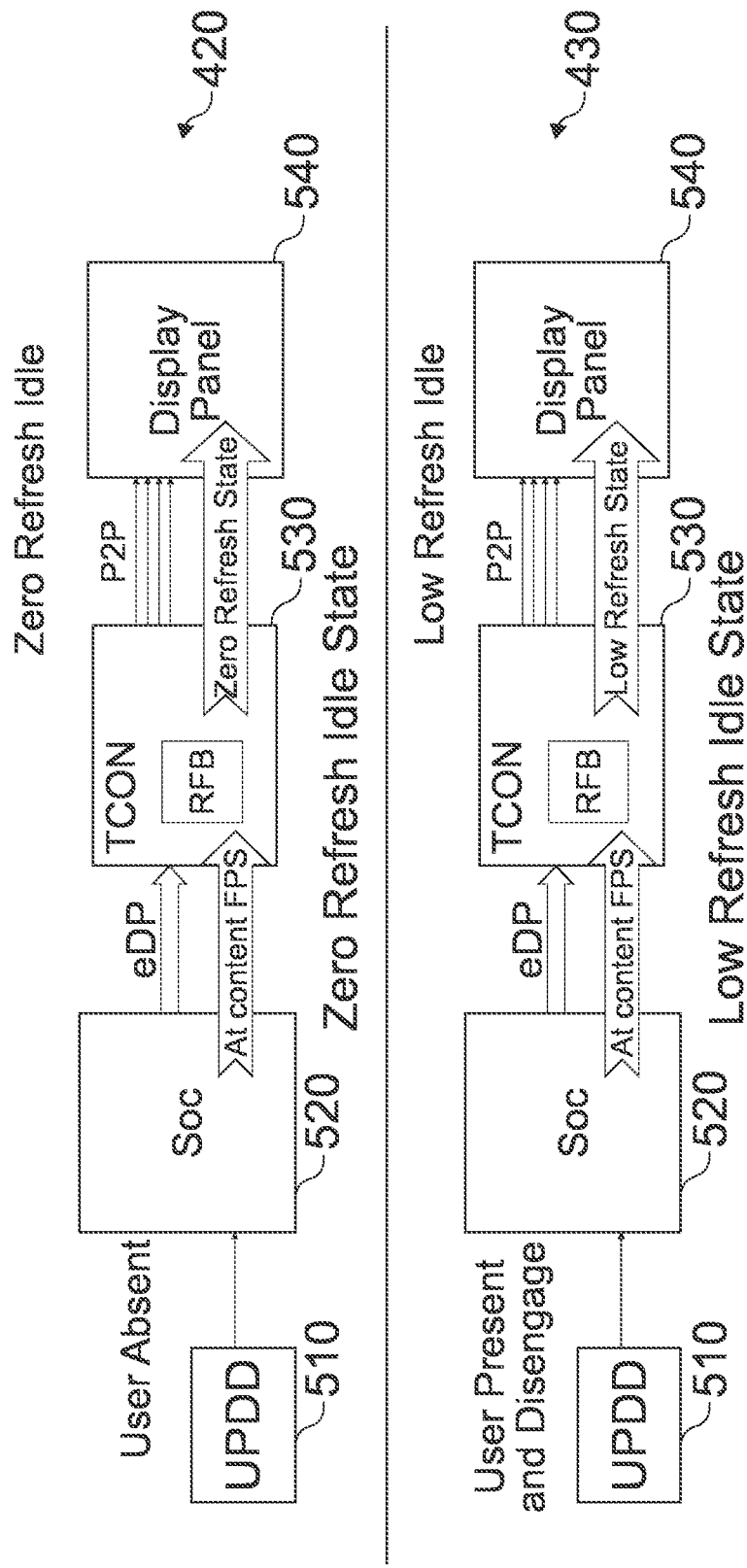
FIG. 5 shows a diagram of an example of an architecture for zero refresh idle and low refresh idle states.

FIG. 5 shows a diagram of an exemplary architecture for the Zero Refresh Idle and Low Refresh Idle States. On the top 420, an architecture for Zero Refresh Idle is shown, on the bottom 410 an architecture for Low Refresh Idle is shown. To initiate Zero Refresh Idle 410, the User Presence Detection Device (UPDD) 510 determines that the user is absent and notifies the SoC 520 (e.g. the processing unit), which provides the eDP signal with at content frames per second to the TCON 530 with the RFB. In addition, the SoC provides the information on the user, which notifies the TCON that the user is absent. The TCON activates the Zero Refresh State (e.g. the second display mode) for the display panel 540, by turning off the display backplane over P2P (peer to peer) interface and turning off the display backlight. For example, the TCON may manage the backend based on the user presence. A similar procedure is applied for the Low Refresh Idle state. To obtain this state, the UPDD 510 determines that the user is present and disengaged and notifies the SoC 520, which provides the eDP signal with at content frames per second to the TCON 530 with the RFB. In addition, the SoC provides the information on the user, which notifies the TCON that the user is present and disengaged. The TCON activates the Low Refresh State (e.g. the third display mode) for the display panel 540

Figure 6:
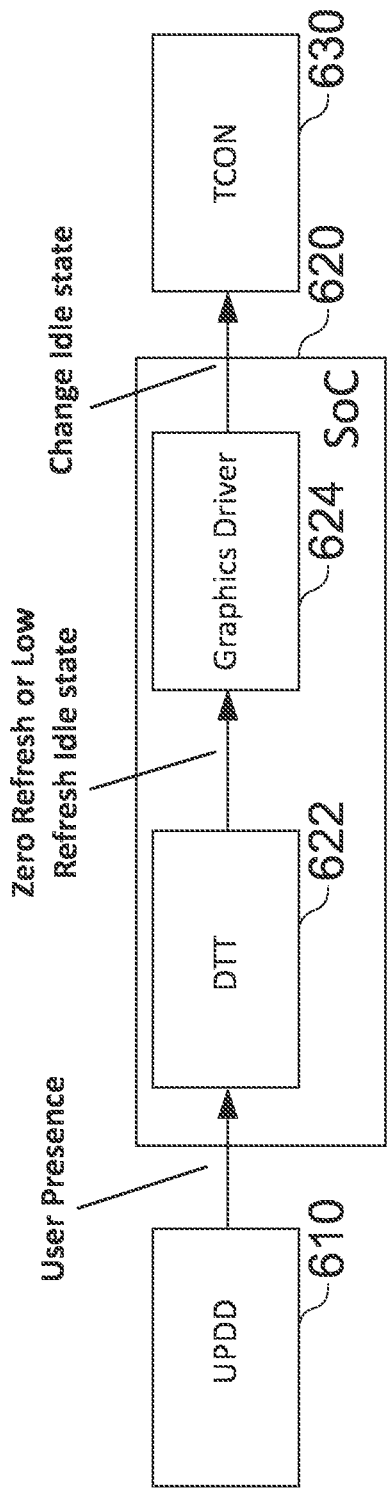
FIG. 6 shows a diagram of a software flow for the proposed idle states.

FIG. 6 shows a diagram of an exemplary software flow for the new idle states. The Dynamic Tuning Technology that manages the UPDD user presence policies may notify the host graphics driver about the user activity which in turn will trigger the new idle states (by providing the information on the user) in the display TCON, as shown in the FIG. 6. For example, a software driver may provide the dynamic tuning functionality, and manage the UPDD policies. For example, when the user walks away from the system, first the UPDD 610 may detect that the user is not present. Then, the UPDD will inform to DTT 622 (which is part of the SoC 620) which may run a second level of policies to ensure user is indeed not present. Next, on confirmation, the DTT may notify the host graphics driver 624 (also run by the SoC 620) that the Zero Refresh Idle State can be triggered. Finally, the host driver activates the Zero Refresh Idle state or the Low Refresh Idle state for TCON 630 over the embedded display panel (eDP) link.

On entry to Zero Refresh Idle State, the TCON may perform one or more of the following actions on the backend, [1] turn off the display backlight, [2] drive all the pixels to be black, [3] turn off the display backplane, [4] turn off the driver logic, [5] finally, turn off the PMIC (Power Management Integrated Circuit), VR (Voltage Regulator), and other backend circuitry etc. At the same time, the TCON frontend may continue to operate in normal display on condition. On user present activity, the Zero Refresh Idle State may instantly exit with one or more of the following actions, [1] turn on the PMIC, VR and other backend circuitry, [2] turn on the display backlight, [3] turn on the drive logic and display backplane, [4] drive the latest data from the RFB on the display backplane. Thereafter, the display resumes normal operation.

Similarly, on entry to Low Refresh Idle State, the TCON will perform one or more of the following actions on backend, [1] lower the display backlight, [2] lower the refresh data of the backend to lowest refresh rate supported by the display. Again, in this state the TCON frontend may continue to operate in normal display on condition. As the user reengages the Low Refresh Idle state may exit with one or more of the following actions, [1] restore the display backlight, [2] drive the latest data form RFB on display backplane. Thereafter, the display resumes normal operation.

The two new idle modes, Zero Refresh Idle and Low Refresh Idle, address the Windows OS limitation of turning off the display without locking the system for UPDD Adaptive Dimming usage. Turning off the TCON backend may provide 90-95% of display power savings compared to turning off display completely and maintaining the TCON frontend alive may provide instant resume capability. Hence the new display idle states may offer the best of both worlds by combining a low power consumption with snappy responsiveness. The idle modes may further provide a display power optimization for a scenario where user is disengaged with the system. For instance, the user may be present in front of the system but facing sideways while discussing with a colleague. Also, the two new idle states may provide instant resume capability on top of lower power.

Examples of the present disclosure may provide an "aggressive" display power management by turning off the display without locking the system before the windows OS timeout of ~5 min. Consequently, the display power may be greatly reduced when the user is disengaged (not interacting and not looking at the system). Examples of the present disclosure provide a user presence-based display power management.

The aspects and features described in relation to a particular one of the previous examples may also be combined with one or more of the further examples to replace an identical or similar feature of that further example or to additionally introduce the features into the further example.

Example 1 relates to a display control apparatus (10) for a display (100), the display control apparatus comprising interface circuitry (12). The display control apparatus (10) comprises processing circuitry (14) configured to obtain, via the interface circuitry, information on a user of the display, the information on the user indicating a presence of the user relative to the display or an engagement of the user with the display, and control, based on the information on the user, a display mode of the display, the display mode affecting at least one of a refresh rate and a backlight of the display.

In Example 2, the subject matter of example 1 or any of the Examples described herein may further include, that the processing circuitry is configured to obtain the information on the user from a processing unit (20) of a computing device (200) comprising the display.

In Example 3, the subject matter of one of the examples 1 to 2 or any of the Examples described herein may further include, that the information on the user is based on a camera-based determination of the presence or engagement of the user.

In Example 4, the subject matter of one of the examples 1 to 3 or any of the Examples described herein may further include, that the processing circuitry is configured to apply a first display mode if the information on the user indicates that the user is present and a second display mode if the information on the user indicates that the user is absent.

In Example 5, the subject matter of example 4 or any of the Examples described herein may further include, that the processing circuitry is configured to apply a first refresh rate in the first display mode and a second refresh rate in the second display mode, the first refresh rate being higher than the second refresh rate.

In Example 6, the subject matter of example 5 or any of the Examples described herein may further include, that the first refresh rate is at least 50 Hz, and wherein the second refresh rate is zero.

In Example 7, the subject matter of one of the examples 4 to 6 or any of the Examples described herein may further include, that the processing circuitry is configured to apply a first backlighting configuration in the first display mode and a second backlighting configuration in the second display mode, the first backlighting configuration yielding a brighter backlight than the second backlighting configuration.

In Example 8, the subject matter of example 7 or any of the Examples described herein may further include, that the processing circuitry is configured to switch off the backlight in the second display mode.

In Example 9, the subject matter of one of the examples 4 to 8 or any of the Examples described herein may further include, that the processing circuitry is configured to set pixels to be displayed on the display to black in the second display mode.

In Example 10, the subject matter of one of the examples 4 to 9 or any of the Examples described herein may further include, that the processing circuitry is configured to apply the first display mode if the information on the user indicates that the user is present and engaged, and to apply a third display mode if the information on the user indicates that the user is present and disengaged.

In Example 11, the subject matter of one of the examples 4 to 10 or any of the Examples described herein may further include, that the processing circuitry is configured to apply a first refresh rate in the first display mode, a second refresh rate in the second display mode, and a third refresh rate in the third display mode, the third refresh rate being between the first refresh rate and the second refresh rate.

In Example 12, the subject matter of example 11 or any of the Examples described herein may further include, that the third refresh rate is at least 1 Hz and less than a nominal refresh rate of the display.

In Example 13, the subject matter of one of the examples 10 to 12 or any of the Examples described herein may further include, that the processing circuitry is configured to apply a first backlighting configuration in the first display mode, a second backlighting configuration in the second display mode and a third backlighting configuration in the third display mode, the third backlighting configuration yielding a brighter backlight than the second backlighting configuration, the first backlighting configuration yielding a brighter backlight than the third backlighting configuration.

In Example 14, the subject matter of one of the examples 4 to 13 or any of the Examples described herein may further include, that the display control apparatus is configured to receive a stream of display data from a processing unit of a computing device comprising the display, and to operate a frame buffer, wherein the processing circuitry is configured to maintain receiving the stream of display data and operating the frame buffer in the first display mode, in the second display mode and/or in a third display mode.

In Example 15, the subject matter of example 14 or any of the Examples described herein may further include, that the display control apparatus comprises a frontend section (16) and a backend section (18), the backend section comprising driver circuitry for driving the display, the frontend section comprising interface circuitry for receiving the stream of display data and the frame buffer, wherein an operation of the frontend section is maintained in the first display mode, in the second display mode and/or in the third display mode, and wherein an operation of the backend section is reduced in the second display mode and in the third display mode.

In Example 16, the subject matter of one of the examples 4 to 15 or any of the Examples described herein may further include, that the processing circuitry is configured to switch off the display if the user remains absent for a pre-defined time interval.

Example 17 relates to a computing device (200) with an integrated display (100), the computing device further comprising the display control apparatus (10) according to one of the examples 1 to 16 and a processing unit (20).

Example 18 relates to a processing unit (20) for a computing device (200), the computing device comprising an integrated display (100), wherein the processing unit is configured to determine information on a user of the display, the information on the user indicating a presence of the user relative to the display or an engagement of the user with the display. The processing unit (20) is configured to provide the information on the user to a display control apparatus of the computing device.

In Example 19, the subject matter of example 18 or any of the Examples described herein may further include, that the information on the user is based on a camera-based determination of the presence or engagement of the user.

Example 20 relates to a computing device with an integrated display, the computing device further comprising the display control apparatus according to one of the examples 1 to 16 and the processing unit according to one of the examples 18 or 19.

Example 21 relates to a display control device (10) for a display (100), the display control device comprising means for communicating (12). The display control device (10) comprises means for processing (14) configured to obtain, via the means for communicating, information on a user of the display, the information on the user indicating a presence of the user relative to the display or an engagement of the user with the display, and control, based on the information on the user, a display mode of the display, the display mode affecting at least one of a refresh rate and a backlight of the display.

In Example 22, the subject matter of example 21 or any of the Examples described herein may further include, that the means for processing is configured to obtain the information on the user from a processing unit (20) of a computing device (200) comprising the display.

In Example 23, the subject matter of one of the examples 21 to 22 or any of the Examples described herein may further include, that the information on the user is based on a camera-based determination of the presence or engagement of the user.

In Example 24, the subject matter of one of the examples 21 to 23 or any of the Examples described herein may further include, that the means for processing is configured to apply a first display mode if the information on the user indicates that the user is present and a second display mode if the information on the user indicates that the user is absent.

In Example 25, the subject matter of example 24 or any of the Examples described herein may further include, that the means for processing is configured to apply a first refresh rate in the first display mode and a second refresh rate in the second display mode, the first refresh rate being higher than the second refresh rate.

In Example 26, the subject matter of example 25 or any of the Examples described herein may further include, that the first refresh rate is at least 50 Hz, and wherein the second refresh rate is zero.

In Example 27, the subject matter of one of the examples 24 to 26 or any of the Examples described herein may further include, that the means for processing is configured to apply a first backlighting configuration in the first display mode and a second backlighting configuration in the second display mode, the first backlighting configuration yielding a brighter backlight than the second backlighting configuration.

In Example 28, the subject matter of example 27 or any of the Examples described herein may further include, that the means for processing is configured to switch off the backlight in the second display mode.

In Example 29, the subject matter of one of the examples 24 to 28 or any of the Examples described herein may further include, that the means for processing is configured to set pixels to be displayed on the display to black in the second display mode.

In Example 30, the subject matter of one of the examples 24 to 29 or any of the Examples described herein may further include, that the means for processing is configured to apply the first display mode if the information on the user indicates that the user is present and engaged, and to apply a third display mode if the information on the user indicates that the user is present and disengaged.

In Example 31, the subject matter of one of the examples 24 to 30 or any of the Examples described herein may further include, that the means for processing is configured to apply a first refresh rate in the first display mode, a second refresh rate in the second display mode, and a third refresh rate in the third display mode, the third refresh rate being between the first refresh rate and the second refresh rate.

In Example 32, the subject matter of example 31 or any of the Examples described herein may further include, that the third refresh rate is at least 1 Hz less than a nominal refresh rate of the display.

In Example 33, the subject matter of one of the examples 30 to 32 or any of the Examples described herein may further include, that the means for processing is configured to apply a first backlighting configuration in the first display mode, a second backlighting configuration in the second display mode and a third backlighting configuration in the third display mode, the third backlighting configuration yielding a brighter backlight than the second backlighting configuration, the first backlighting configuration yielding a brighter backlight than the third backlighting configuration.

In Example 34, the subject matter of one of the examples 24 to 33 or any of the Examples described herein may further include, that the display control device is configured to receive a stream of display data from a processing unit (20) of a computing device (200) comprising the display, and to operate a frame buffer, wherein the means for processing is configured to maintain receiving the stream of display data and operating the frame buffer in the first display mode, in the second display mode and/or in a third display mode.

In Example 35, the subject matter of example 34 or any of the Examples described herein may further include, that the display control device comprises a frontend section (16) and a backend section (18), the backend section comprising means for driving the display, the frontend section comprising means for communicating suitable for receiving the stream of display data and frame buffering means, wherein an operation of the frontend section is maintained in the first display mode, in the second display mode and/or in the third display mode, and wherein an operation of the backend section is reduced in the second display mode and in the third display mode.

In Example 36, the subject matter of one of the examples 24 to 35 or any of the Examples described herein may further include, that the means for processing is configured to switch off the display if the user remains absent for a pre-defined time interval.

Example 37 relates to a computing device (200) with an integrated display (100), the computing device further comprising the display control device (10) according to one of the examples 21 to 36 and a processing unit (20).

Example 38 relates to a processing unit (20) for a computing device (100), the computing device comprising an integrated display, wherein the processing unit is configured to determine information on a user of the display, the information on the user indicating a presence of the user relative to the display or an engagement of the user with the display. The processing unit (20) is configured to provide the information on the user to a display control device of the computing device.

In Example 39, the subject matter of example 38 or any of the Examples described herein may further include, that the information on the user is based on a camera-based determination of the presence or engagement of the user.

Example 40 relates to a computing device (200) with an integrated display (100), the computing device further comprising the display control device (10) according to one of the examples 21 to 36 and the processing unit (20) according to one of the examples 38 or 39.

Example 41 relates to a display control method for a display, the display control method comprising obtaining (110) information on a user of the display, the information on the user indicating a presence of the user relative to the display or an engagement of the user with the display, and controlling (120), based on the information on the user, a display mode of the display, the display mode affecting at least one of a refresh rate and a backlight of the display.

In Example 42, the subject matter of example 41 or any of the Examples described herein may further include, that the method comprises obtaining (110) the information on the user from a processing unit of a computing device comprising the display.

In Example 43, the subject matter of one of the examples 41 to 42 or any of the Examples described herein may further include, that the information on the user is based on a camera-based determination of the presence or engagement of the user.

In Example 44, the subject matter of one of the examples 41 to 43 or any of the Examples described herein may further include, that the method comprises applying (122) a first display mode if the information on the user indicates that the user is present and applying (124) a second display mode if the information on the user indicates that the user is absent.

In Example 45, the subject matter of example 44 or any of the Examples described herein may further include, that the method comprises applying a first refresh rate in the first display mode and a second refresh rate in the second display mode, the first refresh rate being higher than the second refresh rate.

In Example 46, the subject matter of example 45 or any of the Examples described herein may further include, that the first refresh rate is at least 50 Hz, and wherein the second refresh rate is zero.

In Example 47, the subject matter of one of the examples 44 to 46 or any of the Examples described herein may further include, that the method comprises applying a first backlighting configuration in the first display mode and a second backlighting configuration in the second display mode, the first backlighting configuration yielding a brighter backlight than the second backlighting configuration.

In Example 48, the subject matter of example 47 or any of the Examples described herein may further include, that the method comprises switching off the backlight in the second display mode.

In Example 49, the subject matter of one of the examples 44 to 48 or any of the Examples described herein may further include, that the method comprises setting pixels to be displayed on the display to black in the second display mode.

In Example 50, the subject matter of one of the examples 44 to 49 or any of the Examples described herein may further include, that the method comprises applying the first display mode if the information on the user indicates that the user is present and engaged, and applying (126) a third display mode if the information on the user indicates that the user is present and disengaged.

In Example 51, the subject matter of one of the examples 44 to 50 or any of the Examples described herein may further include, that the method comprises applying a first refresh rate in the first display mode, a second refresh rate in the second display mode, and a third refresh rate in the third display mode, the third refresh rate being between the first refresh rate and the second refresh rate.

In Example 52, the subject matter of example 51 or any of the Examples described herein may further include, that the third refresh rate is at least 1 Hz and less than a nominal refresh rate of the display.

In Example 53, the subject matter of one of the examples 50 to 52 or any of the Examples described herein may further include, that the method comprises applying a first backlighting configuration in the first display mode, a second backlighting configuration in the second display mode and a third backlighting configuration in the third display mode, the third backlighting configuration yielding a brighter backlight than the second backlighting configuration, the first backlighting configuration yielding a brighter backlight than the third backlighting configuration.

In Example 54, the subject matter of one of the examples 44 to 53 or any of the Examples described herein may further include, that the display receives a stream of display data from a processing unit of a computing device comprising the display, and operates a frame buffer, wherein the method comprises maintaining (130) receiving the stream of display data and operating the frame buffer in the first display mode, in the second display mode and/or in a third display mode.

In Example 55, the subject matter of example 54 or any of the Examples described herein may further include, that a display controller of the display comprises a frontend section and a backend section, the backend section comprising driver circuitry for driving the display, the frontend section comprising interface circuitry for receiving the stream of display data and the frame buffer, wherein an operation of the frontend section is maintained (130) in the first display mode, in the second display mode and/or in the third display mode, and wherein an operation of the backend section is reduced in the second display mode and in the third display mode.

In Example 56, the subject matter of one of the examples 44 to 55 or any of the Examples described herein may further include, that the method comprises switching (140) off the display if the user remains absent for a pre-defined time interval.

Example 57 relates to a computing device with an integrated display, wherein a display controller for the display is configured to perform the method according to one of the examples 41 to 56 and a processing unit.

Example 58 relates to a method for a computing device, the computing device comprising an integrated display, wherein the method comprises determining (210) information on a user of the display, the information on the user indicating a presence of the user relative to the display or an engagement of the user with the display. The method comprises providing (220) the information on the user to a display controller of the computing device.

In Example 59, the subject matter of example 58 or any of the Examples described herein may further include, that the information on the user is based on a camera-based determination of the presence or engagement of the user.

Example 60 relates to a computing device with an integrated display, the computing device further comprising a display controller configured to perform the method according to one of the examples 41 to 56 and a processing unit configured to perform the method according to one of the examples 58 or 59.

Example 61 relates to a machine-readable storage medium including program code, when executed, to cause a machine to perform the method of one of the examples 41 to 56 or the method of one of the examples 58 or 59.

Example 62 relates to a computer program having a program code for performing the method of one of the examples 41 to 56 or the method of one of the examples 58 or 59, when the computer program is executed on a computer, a processor, or a programmable hardware component.

Example 63 relates to a machine-readable storage including machine readable instructions, when executed, to implement a method or realize an apparatus as claimed in any pending claim or shown in any Example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A processing unit for a computing device, the computing device comprising an integrated display, the processing unit being a system on a chip or a processor, wherein the processing unit is configured to:
    determine information on a user of the display, the information on the user indicating a presence of the user relative to the display,
    wherein the processing unit is configured to determine the presence of the user using a separate user presence detection device, and to determine the information on the user by applying a second round of policies on presence information provided by the separate user presence detection device to ensure the user is indeed present or not present; and
    provide the information on the user to a display control apparatus of the computing device.

2. The processing unit according to claim 1, wherein the processing unit configured to determine whether the user is present in front of the display or whether the user has been present in front of the display within a pre-defined time interval based on the presence information provided by the separate user presence detection device.

3. The processing unit according to claim 1, wherein the information on the user is based on a camera-based determination of the presence of the user that is performed by the separate user presence detection device.

4. A computation device comprising the processing unit according to claim 1, an integrated display, a user presence detection device and a display control apparatus.

5. The computation device according to claim 4, wherein the display control apparatus comprises interface circuitry and processing circuitry, the processing circuitry being configured to obtain, via the interface circuitry, the information on a user of the display from the processing unit, the information on the user indicating a presence of the user relative to the display, and to control, based on the information on the user, a display mode of the display, the display mode affecting at least one of a refresh rate and a backlight of the display.

6. The computation device according to claim 5, wherein the display control apparatus is configured to apply a first display mode if the information on the user indicates that the user is present and a second display mode if the information on the user indicates that the user is absent.

7. The computation device according to claim 6, wherein the processing circuitry of the display control apparatus is configured to apply a first refresh rate in the first display mode and a second refresh rate in the second display mode, the first refresh rate being higher than the second refresh rate.

8. The computation device according to claim 7, wherein the first refresh rate is at least 50 Hz, and wherein the second refresh rate is zero.

9. The computation device according to claim 6, wherein the processing circuitry of the display control apparatus is configured to apply a first backlighting configuration in the first display mode and a second backlighting configuration in the second display mode, the first backlighting configuration yielding a brighter backlight than the second backlighting configuration.

10. The computation device according to claim 9, wherein the processing circuitry of the display control apparatus is configured to switch off the backlight in the second display mode.

11. The computation device according to claim 6, wherein the processing circuitry of the display control apparatus is configured to set pixels to be displayed on the display to black in the second display mode.

12. The computation device according to claim 6, wherein the display control apparatus is configured to receive a stream of display data from the processing unit of the computing device comprising the display, and to operate a frame buffer, wherein the processing circuitry of the display control apparatus is configured to maintain receiving the stream of display data and operating the frame buffer in the first display mode, in the second display mode and/or in a third display mode.

13. The computation device according to claim 12, wherein the display control apparatus comprises a frontend section and a backend section, the backend section comprising driver circuitry for driving the display, the frontend section comprising interface circuitry for receiving the stream of display data and the frame buffer, wherein an operation of the frontend section is maintained in the first display mode, in the second display mode and/or in the third display mode, and wherein an operation of the backend section is reduced in the second display mode and in the third display mode.

14. The computation device according to claim 6, wherein the of the display control apparatus is configured to switch off the display if the user remains absent for a pre-defined time interval.

15. The computation device according to claim 1, wherein the processing circuitry of the display control apparatus is configured to obtain the information on the user from a processing unit of a computing device comprising the display.

16. A non-transitory machine-readable storage medium including program code, when executed, to cause a machine to perform a method for a computing device, the computing device comprising an integrated display, wherein the method comprises:

determining information on a user of the display, the information on the user indicating a presence of the user relative to the display; and wherein the presence of the user is determined based on presence information provided by a separate user presence detection device, the information on the user being determined by applying a second round of policies on the presence information provided by the separate user presence detection device to ensure the user is indeed present or not present; and providing the information on the user to a display controller of the computing device.

17. The non-transitory machine-readable storage medium according to claim 16, wherein the information on the user is based on a camera-based determination of the presence of the user that is performed by the separate user presence detection device.

* * * * *